(12) United States Patent
Kapoor et al.

(10) Patent No.: US 9,510,217 B2
(45) Date of Patent: Nov. 29, 2016

(54) METHOD AND APPARATUS FOR ENHANCED APPLICATION SIGNALING FROM A WIRELESS COMMUNICATIONS DEVICE

(71) Applicant: QUALCOMM Incorporated, San Diego, CA (US)

(72) Inventors: Rohit Kapoor, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/087,907

(22) Filed: Nov. 22, 2013

(65) Prior Publication Data

US 2014/0355458 A1    Dec. 4, 2014

Related U.S. Application Data

(60) Provisional application No. 61/827,865, filed on May 28, 2013.

(51) Int. Cl.
| | |
|---|---|
| *H04W 24/08* | (2009.01) |
| *H04L 1/00* | (2006.01) |
| *H04W 4/00* | (2009.01) |
| *H04W 52/00* | (2009.01) |
| *H04W 76/04* | (2009.01) |
| *H04L 12/24* | (2006.01) |
| *H04B 17/318* | (2015.01) |

(Continued)

(52) U.S. Cl.
CPC ............ *H04W 24/08* (2013.01); *H04B 17/318* (2015.01); *H04L 1/0026* (2013.01); *H04L 41/0893* (2013.01); *H04L 69/40* (2013.01); *H04W 4/003* (2013.01); *H04W 52/00* (2013.01); *H04W 76/045* (2013.01); *H04L 67/325* (2013.01)

(58) Field of Classification Search
CPC ............ H04Q 7/32; H04M 1/26; H04B 7/00
See application file for complete search history.

(56) References Cited

U.S. PATENT DOCUMENTS 6,829,493 B1    12/2004 Hunzinger
8,649,816 B2 *  2/2014  Song ............................ 455/522

(Continued)

FOREIGN PATENT DOCUMENTS

EP            1 973 355 A1    9/2008

OTHER PUBLICATIONS

International Search Report dated Aug. 1, 2014 issued in International Application No. PCT/US2014/039523.

*Primary Examiner* — Hoon J Chung
*Assistant Examiner* — Zhensheng Zhang
(74) *Attorney, Agent, or Firm* — Arent Fox LLP

(57) ABSTRACT

Methods and apparatus for signaling adjustments include identifying, by a user equipment (UE), a change in a reachability state of the UE based at least in part on one or more channel metrics determined by a modem in the UE. Further, the methods and apparatus include adjusting a transmission of connectivity signals (e.g., keep-alive signals) to a server from an application on the UE, the adjusting being based at least in part on an indication of the change in the reachability state provided to the application via an interface in communication with the modem (e.g., modem application programming interface or API). Additionally, the methods and apparatus can include transmitting an indication of the change in the reachability state to the server. Moreover, the methods and apparatus may accommodate signaling adjustments for one or more applications on the UE and one or more servers in a wireless communication system.

18 Claims, 11 Drawing Sheets

(51) Int. Cl.
*H04L 29/14* (2006.01)
*H04L 29/08* (2006.01)

(56) References Cited

U.S. PATENT DOCUMENTS 8,762,482 B2 * 6/2014 Raghunathan et al. ...... 709/217
2010/0302957 A1 12/2010 Ketheesan et al.
2012/0084344 A1 * 4/2012 Kalyanasundaram .. H04W 8/22
                  709/203
2012/0137146 A1 * 5/2012 Karanth et al. ............... 713/310
2012/0294157 A1 * 11/2012 Guo ........................ H04L 43/10
                  370/251
2013/0077564 A1 * 3/2013 Tiwari ........................ 370/328
2013/0194965 A1 * 8/2013 Vedantham et al. .......... 370/254
2013/0219045 A1 * 8/2013 Agarwal et al. ............... 709/224

* cited by examiner

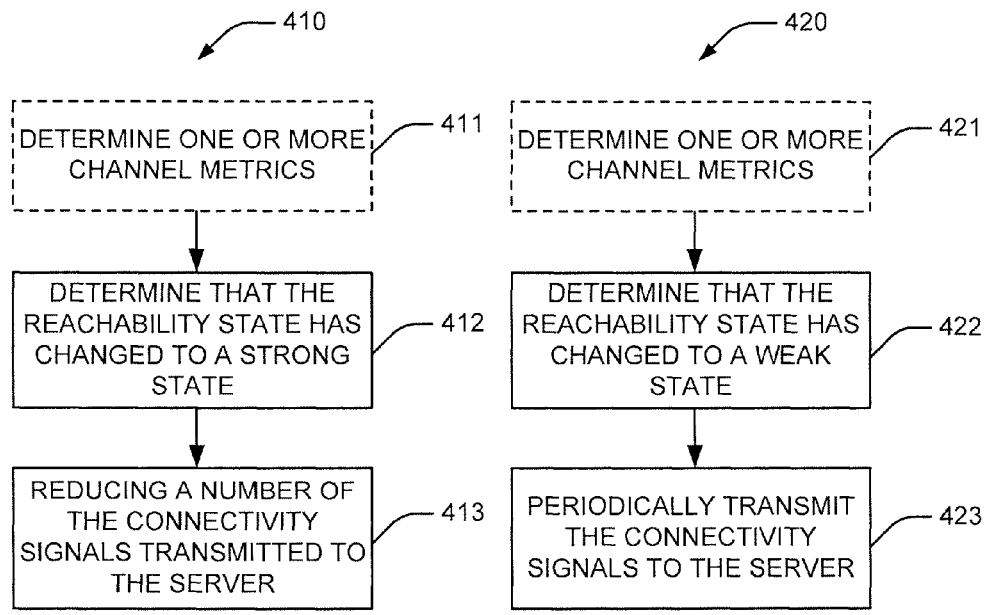
*FIG. 4A*  *FIG. 4B*
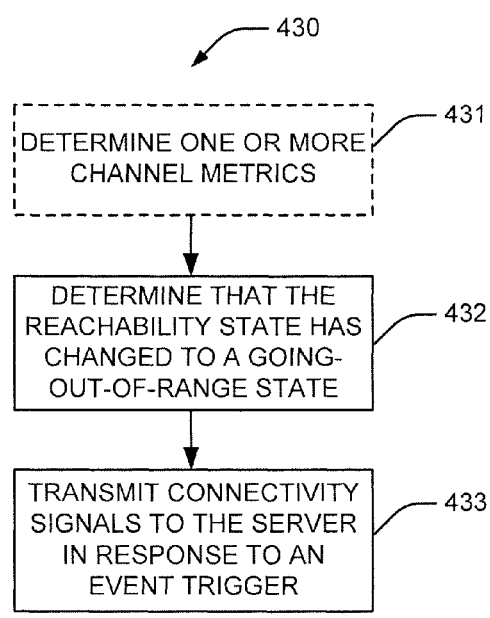
*FIG. 4C*

METHOD AND APPARATUS FOR ENHANCED APPLICATION SIGNALING FROM A WIRELESS COMMUNICATIONS DEVICE

CLAIM FOR PRIORITY UNDER 35 U.S.C. §119

The present application for patent claims priority to Provisional Application No. 61/827,865 entitled "MODEM API FOR QRD TO INDICATE 'REACHABILITY'" filed May 28, 2013, and assigned to the assignee hereof and hereby expressly incorporated by reference herein.

BACKGROUND

Aspects of the present disclosure relate generally to wireless communication systems, and more particularly, to enhanced application signaling from a wireless communications device.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

In some wireless communication networks, the transmission of connectivity signals (e.g., keep-alive signals) between a user equipment and application server may cause unwanted signaling overhead in an operator's wireless communication network because of the large number of applications that are running on user equipment and that are frequently sending updates to their respective application servers Even more, the foregoing signaling overhead may often lead to degradations in wireless communication. Additionally, the excessive transmission of connectivity signals may cause an increased use of user equipment resources such as battery resources.

Thus, improvements in the signaling from applications in the user equipment may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of a method for signaling adjustments are described where the method comprises identifying, by a user equipment (UE), a change in a reachability state of the UE based at least in part on one or more channel metrics determined by a modem in the UE. Further the method comprises adjusting a transmission of connectivity signals to a server from an application on the UE, where the adjusting may be based at least in part on an indication of the change in the reachability state provided to the application via an interface in communication with the modem.

Additional aspects of the method include identifying a change in a reachability state by determining, by the modem of the UE, that the reachability state has changed. The method may include providing the indication of the change in the reachability state from the modem to the application via the interface. The method may include providing the indication of the change in the reachability state from the modem to an operating system of the UE via the interface. The method may include transmitting an indication of the change in the reachability state to the server.

In other aspects of the method, identifying a change in a reachability state includes applying a hysteresis by adjusting a threshold value to determine a current state of the reachability state based at least in part on a previous state of the reachability state. In some aspects, the one or more channel metrics may include a signal quality metric. In some aspects, the one or more channel metrics may include a signal strength metric.

In some aspects of the method, identifying a change in a reachability state may include determining that the reachability state has changed to a strong state, and adjusting a transmission of connectivity signals to a server may include reducing a number of the connectivity signals transmitted to the server when in the strong state. In some aspects of the method, identifying a change in a reachability state may include determining that the reachability state has changed to a weak state, and adjusting a transmission of connectivity signals to the server may include periodically transmitting the connectivity signals to the server when in the weak state. In some aspects of the method, identifying a change in a reachability state comprises determining that the reachability state has changed to a going-out-of-range state, and adjusting a transmission of connectivity signals to the server may include transmitting the connectivity signals to the server in response to an event trigger when in the going-out-of-range state.

In aspects of the method, the application may be a first application, and the method may also include adjusting, based at least in part on the change in the reachability state, a transmission of connectivity signals to the server or to a different server from a second application on the UE. In some aspects of the method, adjusting a transmission of connectivity signals to a server may include adjusting the transmission from a periodic transmission of connectivity signals to a non-periodic transmission of connectivity signals.

Additional aspects provide an apparatus for signaling adjustments comprises a modem component configured to determine one or more channel metrics. The apparatus may further comprise a reachability component that includes an identifying component configured to identify a change in a reachability state of a UE based at least in part on the one or more channel metrics. Moreover, the reachability component further comprises an adjusting component configured to adjust a transmission of connectivity signals to a server from an application on the UE, where the adjusting being based at least in part on an indication of the change in the reachability state provided to the application via an interface in communication with the modem component.

Further aspects provide a computer program product for signaling adjustments, comprising a non-transitory computer-readable medium comprising code that, when executed by a processor or processing system included within a user equipment (UE), causes the UE to identify a change in a reachability state of the UE based at least in part on one or more channel metrics determined by a modem in the UE. Additionally, the computer-readable medium comprises code that, when executed by a processor or processing system included within a user equipment (UE), causes the UE adjust a transmission of connectivity signals to a server from an application on the UE, the adjusting being based at least in part on an indication of the change in the reachability state provided to the application via an interface in communication with the modem.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 4A is a flowchart illustrating an aspect of the reachability state and transmission of connectivity signals of the UE in FIG. 1;

FIG. 4B is a flowchart illustrating an another aspect of the reachability state and transmission of connectivity signals of the UE in FIG. 1;

FIG. 4C is a flowchart illustrating a further aspect of the reachability state and transmission of connectivity signals of the UE in FIG. 1;

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to enhancements in application signaling from a wireless communications device. Specifically, a user equipment (UE) may contain one or more applications that communicate with a respective server (e.g., an application server) through a wireless communication system. Further, the UE may generally transmit connectivity signals (e.g., keep-alive signals) to the server so that the server may be made aware that the application is reachable through the wireless communication system. An UE and/or application executing on the UE may be considered reachable when it is in an active mode and/or when signals transmitted to the UE and/or application via the wireless communications system are likely to be received, processed, and/or handled by the UE and/or application. Thus, reachability may refer to the degree, level, and/or probability of the UE and/or the application being reachable by the server through the wireless communication system.

The UE may transmit the connectivity signals in a scheduled (e.g., periodic) manner, however, non-scheduled transmission may also be supported. In some non-limiting cases, however, the transmission of connectivity signals to the server may be deemed inefficient. For example, multiple keep-alive signals may be transmitted to indicate reachability of the UE even when little has changed in terms of the reachability conditions of the UE. In such cases, not only is power consumed by the UE to perform the transmissions, but the large number of signals transmitted may have an effect on the wireless communications network and/or the application server receiving the signals. As such, according to the present apparatus and methods, an adjustment of the transmission of connectivity signals to a server from an application on the UE may be made to enhance signaling from the application. Accordingly, in some aspects, the present methods and apparatus may provide an efficient solution, as compared to current solutions, to more effectively utilize the transmission of connectivity signals for signaling from the application.

Figure 1:
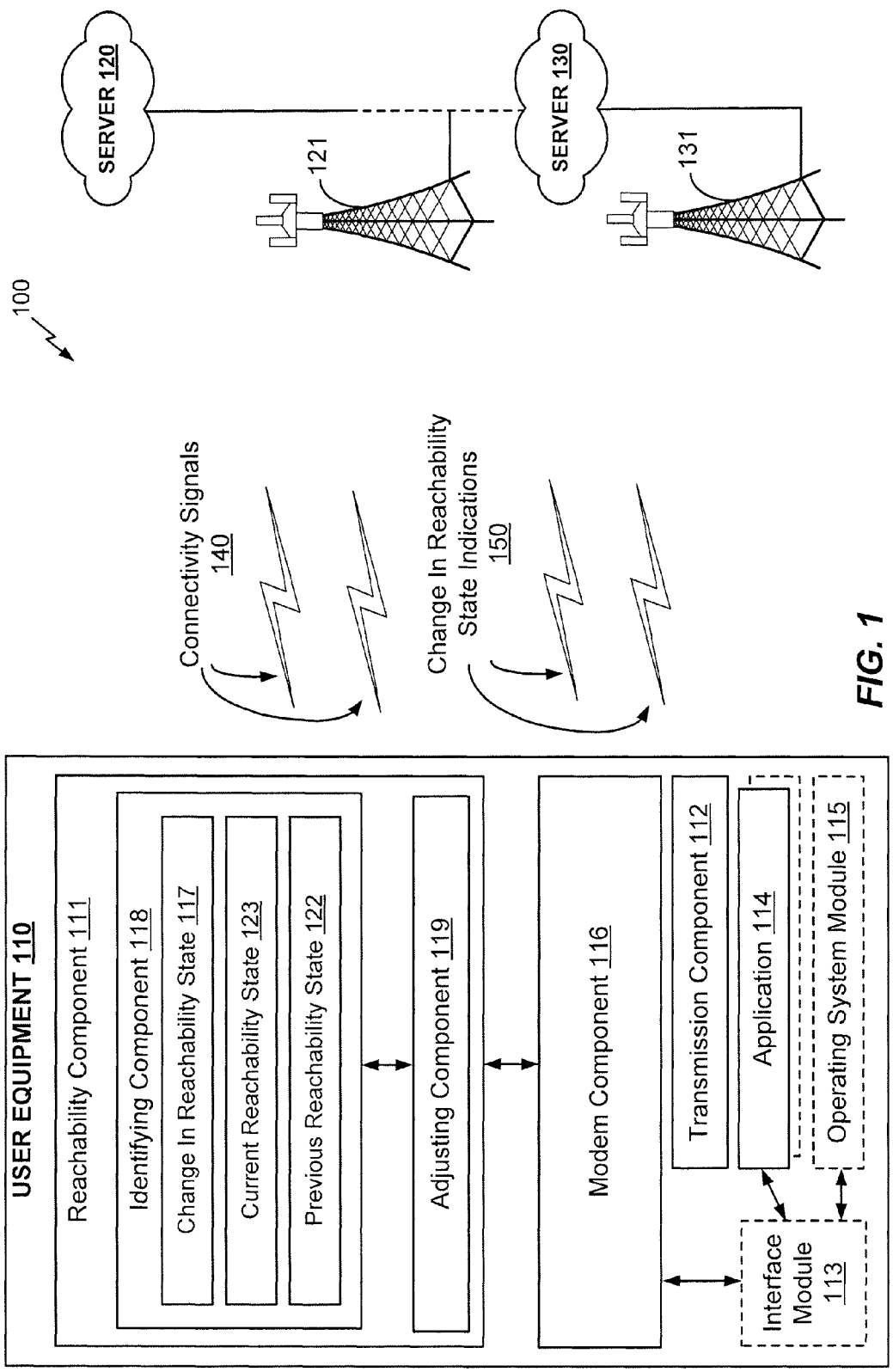
FIG. 1 is a schematic diagram of a communication network including an aspect of a user equipment that may enhance signaling from applications.

Referring to FIG. 1, in one aspect, a wireless communication system 100 includes at least one UE 110 in communication with at least one server 120 and/or 130. UE 110 may communicate with server 120 and/or 130 by way of, for instance, either network entity 121 and/or 131 (e.g., base station). Further, UE 110 may transmit connectivity signals 140 (e.g., keep-alive signals) and/or change in reachability state indications or indicators 150 to server 120 and/or 130 via network entity 121 and/or 131. Further aspects of server 120 and 130 are described below with respect to FIG. 2.

In some aspects, UE 110 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, network entity 121 and/or 131 may be a macrocell, picocell, femtocell, relay, Node B, mobile Node B, UE (e.g., communicating in peer-to-peer or ad-hoc mode with UE 110), or substantially any type of component that can communicate with UE 110 to provide wireless network access at the UE 100.

According to the present aspects, UE 110 may include modem component 116, which may be configured to determine and/or process one or more channel metrics. As an example, the one or more channel metrics may comprise a signal quality metric. As another example, the one or more channel metrics may comprise a signal strength metric (e.g., signal-to-noise ratio or SNR metrics).

In another aspect, modem component 116 may be configured to determine that the reachability state of UE 110 has changed. Further to the aspect, modem component 116 may be further configured to provide an indication of the change in reachability state 117 to application 114 via interface module 113. As another variation of the aspect, modem component 116 may be further configured to provide an indication of the change in reachability state 117 to operating system module 115 via interface module 113.

Further to the present aspects, UE 110 may include reachability component 111, which may be configured to establish, determine, and/or identify a reachability state of UE 110 and adjust the transmission of connectivity signals 140 to server 120 and/or 130.

In another aspect, reachability component 111 may include identifying component 118, which may be configured to identify aspects as to the reachability state of UE 110. As an example, identifying component 118 may be configured to determine a current reachability state 123 of UE 110. As another example, identifying component 118 may be configured to store one or more previous reachability states 122 of UE 110. As yet another example, identifying component 118 may be configured to identify a change in reachability state 120 of UE 110 based at least in part on one or more channel metrics determined by modem component 116.

In a further aspect, reachability component 111 may include adjusting component 119, which may be configured to adjust a transmission of connectivity signals 140 to a server, such as server 120 and/or 130, from one or more applications 114 on UE 110 through transmission component 112. Further to the aspect, adjusting component 119 may adjust the transmission of connectivity signals 140 based at least in part on an indication from modem component 116 of change in reachability state 117 provided to application 114 via interface module 113. As a variation on the aspect, transmission component 112 may be configured to transmit change in reachability state indications 150 to the server 120 and/or 130 by way of network entity 121 and/or 131.

In yet another aspect, some or all of the features and functions of the reachability component 111 may be implemented in the modem component 116. That is, the modem component 116 may include one or more of the components in the reachability component 111. Moreover, the modem component 116 may be in communication with the interface module 113. The interface module 113 may also be referred to as an application programming interface or API. In some aspects, at least a portion of the interface module 113 may be implemented in the modem component 116.

Figure 2:
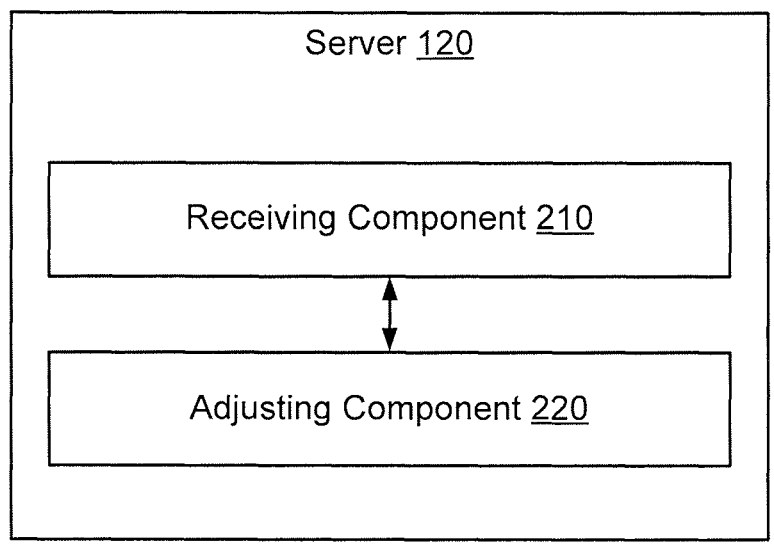
FIG. 2 is a schematic diagram of an aspect of a server included in the communication network of FIG. 1.

Referring to FIG. 2, an aspect of server 120 is described. The description of server 120 is not intended to be limited to server 120, and may describe server 130 or other servers in wireless communication system 100. Server 120 may include various components and/or subcomponents, which may be configured to enhance signaling (e.g., signaling from an application) with a UE, such as UE 110 (FIG. 1) by adjusting a set of expectations for the transmission of connectivity signals 140.

Further, for example, server 120 may include receiving component 210, which may be configured to receive change in reachability state indications 150 from a UE such as UE 110 (FIG. 1). Moreover, receiving component 210 may be configured to receive connectivity signals 140 from UE 110. Further in the example, server 120 may include adjusting component 220, which may be configured to adjust the expected transmission of connectivity signals 140 from UE 110. The adjusting of the expected transmission of connectivity signals 140 from UE 110 may be based at least in part on the received change in reachability state indications 150.

In an aspect, a change in reachability state may be identified and indicated by the reachability state indications 150 in which the reachability state has changed to a strong state. In such cases, the reachability state indications 150 may indicate a need for the server 120 to adjust (e.g., by the adjusting component 220) the expectation of the transmission of connectivity signals 140 to a reduced number of transmissions of the connectivity signals 140 when in the strong state. As an example, prior to the change in reachability state to the strong state, UE 110 may have been transmitting connectivity signals to the server in periodic or event-triggered transmissions. Further to the example, as a result of the change in reachability state to the strong state, UE 110 may subsequently transmit connectivity signals to the server in non-periodic transmissions or may transmit no connectivity signals at all.

In another aspect, a change in reachability state may be identified and indicated by the reachability state indications 150 in which the reachability state has changed to a weak state. In such cases, the reachability state indications 150 may indicate a need for the server 120 to adjust (e.g., by the adjusting component 220) the expectation of the transmission of connectivity signals 140 to periodic transmissions of the connectivity signals 140 when in the weak state. As an example, prior to the change in reachability state to the weak state, UE 110 may have been transmitting connectivity signals to the server in non-periodic or event-triggered transmissions. Further to the example, as a result of the change in reachability state to the weak state, UE 110 may subsequently transmit connectivity signals to the server in periodic transmissions.

In yet another aspect, a change in reachability state may be identified and indicated by the reachability state indications 150 in which the reachability state has changed to a going-out-of-range state. In such cases, the reachability state indications 150 may indicate a need for the server 120 to adjust (e.g., by the adjusting component 220) the expectation of the transmission of connectivity signals 140 to event-triggered transmissions of the connectivity signals 140 when in the going-out-of-range state. As an example, prior to the change in reachability state to the going-out-of-range state, UE 110 may have been transmitting connectivity signals to the server in periodic or non-periodic transmissions. Further to the example, as a result of the change in reachability state to the going-out-of-range state, UE 110 may subsequently transmit connectivity signals to the server to notify the server that an event affecting the reachability of UE 110 has occurred. In some non-limiting cases, the event may be the UE enters a powered down state for which the UE transmits a deregistration message to the server, thus informing the server that the power down event has occurred.

Figure 3:
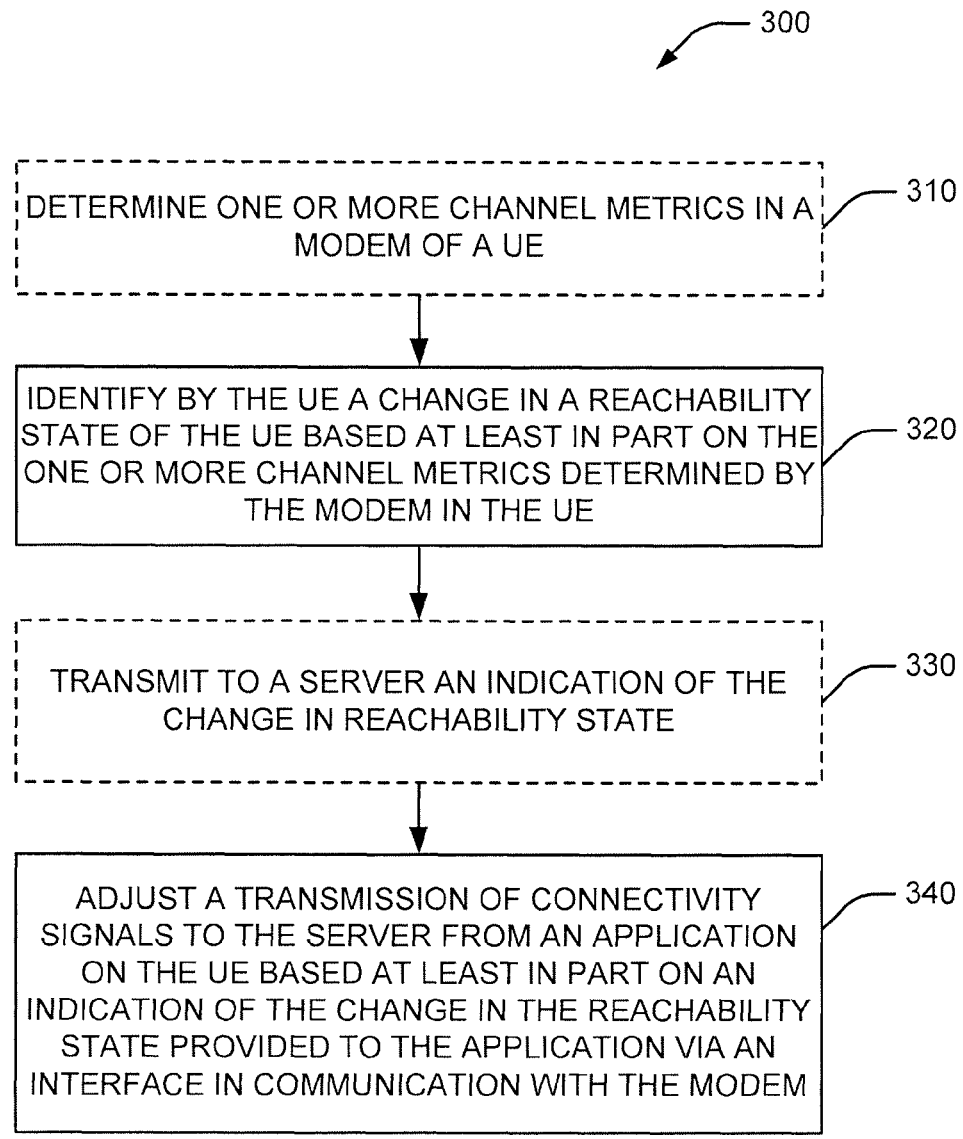
FIG. 3 is a flowchart of an aspect of the application signaling adjustment features of FIG. 1.

Referring now to FIG. 3, in operation, a UE such as UE 110 (FIG. 1) may perform one aspect of a method 300 for enhancing signaling from applications. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

In an aspect, at block 310, method 300 may optionally include determining one or more channel metrics in a modem of the UE. For example, as described herein, modem component 116 (FIG. 1) may determine one or more channel metrics, wherein the one or more channel metrics comprises a signal quality metric. As another example, modem component 116 may determine one or more channel metrics, wherein the one or more channel metrics comprise a signal strength metric.

Moreover, at block 320, method 300 may include identifying a change in a reachability state of the UE based at least in part on the one or more channel metrics. For instance, as described herein, reachability component 111 may execute identifying component 118 to identify a change in reachability state 117 of UE 110 (FIG. 1) based at least in part on the one or more channel metrics determined by modem component 116. In an alternative aspect, as further described below with respect to FIG. 5 and FIG. 6, modem component 116 may be configured to determine that current reachability state 123 has changed.

In addition, at block 330, method 300 may optionally include transmitting to a server an indication of the change in reachability state. In an aspect, as described herein, UE 110 (FIG. 1) may execute transmission component 112 to transmit change in reachability state indicators 150 to a server (e.g., server 120 and/or 130, FIG. 1) by way of a network entity (e.g., network entity 121 and/or 131, FIG. 1).

Further, at block 340, method 300 may include adjusting a transmission of connectivity signals to a server from an application on the UE, where the adjusting may be based at least in part on an indication of change in reachability state 117 provided by modem component 116 to application 114 via interface module 113. In various aspects, reachability component 111 of UE 110 may execute adjusting component 119 to adjust a transmission of connectivity signals 140 to a server 120 and/or 130 by way of a network entity 121 and/or 131. Further in various aspects, the adjusting may be based at least in part on change in reachability state 117 of UE 110. In addition, an indication of change in reachability state 117 may be provided by modem component 116 to operating system (OS) module 115 via interface module 113.

Referring to FIG. 4A, method 410 describes one example of the various aspects of adjusting a transmission of connectivity signals. At block 411, method 410 may optionally include determining one or more channel metrics. Further to the aspects of the one example, as described herein, modem component 116 may determine the one or more channel metrics, wherein the one or more channel metrics comprise a signal quality metric and/or a signal strength metric.

Moreover, at block 412, method 410 may include determining that the reachability state of a UE has changed to a strong state. A strong reachability state may refer to a state in which signal strength and/or signal quality at the UE is high and the UE and/or application in the UE are likely to be reached by a server through the wireless communications system. Further to the aspects of the one example, as described herein, identifying component 118 of the UE (e.g., UE 110, FIG. 1) may determine that the change in reachability state 117 has changed to a strong reachability state. For instance, identifying component 118 of UE 110 may compare previous reachability state 122 with current reachability state 123 to determine change in reachability state 117. Optionally, identifying component 118 of UE 110 may apply a hysteresis by adjusting a threshold value to determine current reachability state 123 based at least in part on previous reachability state 122 when determining change in a reachability state 120 (e.g., hysteresis). In an alternative aspect, as further described below with respect to FIG. 5 and FIG. 6, modem component 116 may be configured to determine that current reachability state 123 has changed.

Further, at block 413, method 410 may include adjusting a transmission of connectivity signals to a server by reducing the number of the connectivity signals transmitted to the server when in the strong reachability state. As an example, as described herein, adjusting component 119 of the UE (e.g., UE 110, FIG. 1) may adjust a transmission of connectivity signals 140 to a server (e.g., server 120 and/or 130, FIG. 1) by way of a network entity (e.g., network entity 121 and/or 131, FIG. 1). Further to the example, the adjusting of the transmission of connectivity signals 140 may comprise reducing the number of the connectivity signals 140 by transmission component 112 to server 120 and/or 130 when change in reachability state 117 indicates that the current reachability state 123 has changed to a strong reachability state. In this respect, the server may receive an indication of the change in reachability state from a respective application or UE operating system (e.g., change in reachability state indications 150 received by receiving component 210) and may adjust its operations accordingly (e.g., adjusting expected transmission of connectivity signals 140 at adjusting component 220).

Referring to FIG. 4B, method 420 describes another example of the various aspects of adjusting a transmission of connectivity signals. At block 421, method 420 may optionally include determining one or more channel metrics. Further to the aspects of the one example, as described herein, modem component 116 may determine the one or more channel metrics, wherein the one or more channel metrics comprise a signal quality metric and/or a signal strength metric.

Moreover, at block 422, method 420 may include determining that the reachability state of a UE has changed to a weak state. A weak reachability state may refer to a state in which signal strength and/or signal quality at the UE is low and the UE and/or application in the UE are likely not to be reached by a server through the wireless communications system. Further to the aspects of the another example, as described herein, identifying component 118 of the UE (e.g., UE 110, FIG. 1) may determine that the change in reachability state 117 has changed to a weak reachability state. For instance, identifying component 118 of UE 110 may compare previous reachability state 122 with current reachability state 123 to determine change in reachability state 117. Optionally, identifying component 118 of UE 110 may apply a hysteresis by adjusting a threshold value to determine current reachability state 123 based at least in part on previous reachability state 122 when determining change in a reachability state 120 (e.g., hysteresis). In an alternative aspect, as further described below with respect to FIG. 5 and FIG. 6, modem component 116 may be configured to determine that current reachability state 123 has changed.

Further, at block 423, method 420 may include adjusting a transmission of connectivity signals to a server by periodically transmitting the connectivity signals to the server when in the weak reachability state. As an example, as described herein, adjusting component 119 of the UE (e.g., UE 110, FIG. 1) may adjust a transmission of connectivity signals 140 to a server (e.g., server 120 and/or 130, FIG. 1) by way of a network entity (e.g., network entity 121 and/or 131, FIG. 1). Further to the example, the adjusting of the transmission of connectivity signals 140 may comprise periodically transmitting the connectivity signals 140 by transmission component 112 to server 120 and/or 130 when change in reachability state 117 indicates that the current reachability state 123 has changed to a weak reachability state. In this respect, the server may receive an indication of the change in reachability state from a respective application or UE operating system (e.g., change in reachability state indications 150 received by receiving component 210) and may adjust its operations accordingly (e.g., adjusting expected transmission of connectivity signals 140 at adjusting component 220).

Referring to FIG. 4C, method 430 describes a further example of the various aspects of adjusting a transmission of connectivity signals. At block 431, method 430 may optionally include determining one or more channel metrics. Further to the aspects of the one example, as described herein, modem component 116 may determine the one or more channel metrics, wherein the one or more channel metrics comprise a signal quality metric and/or a signal strength metric.

In some aspects, the going-out-of-range reachability state may correspond to UE 110 going outside of the coverage of wireless communication system 100. Additionally, the going-out-of-range reachability state may correspond to UE 110 entering into a do-not-disturb mode, UE 110 entering a powered off mode, UE 110 entering a standby mode, or other suitable terminology used in the art. When the UE 110 enters into any one of such modes, there may need to be a delay in turning off some of the capabilities of the UE 110 to allow the modem component 116 to indicate to the application 114 and/or the operating system module 115 of the change in order for the application 114 and/or the operating system module 115 to transmit change in reachability state indications 150 to the appropriate servers (e.g., server 120 and/or server 130).

Moreover, at block 432, method 430 may include determining that the reachability state of a UE has changed to a going-out-of-range reachability state. Further to the aspects of the further example, as described herein, identifying component 118 of the UE (e.g., UE 110, FIG. 1) may determine that the change in reachability state 117 has changed to a going-out-of-range reachability state. For instance, identifying component 118 of UE 110 may compare previous reachability state 122 with current reachability state 123 to determine change in reachability state 117. Optionally, identifying component 118 of UE 110 may apply a hysteresis by adjusting a threshold value to determine current reachability state 123 based at least in part on previous reachability state 122 when determining change in a reachability state 120 (e.g., hysteresis). In an alternative aspect, as further described below with respect to FIG. 5 and FIG. 6, modem component 116 may be configured to determine that current reachability state 123 has changed.

Further, at block 433, method 430 may include adjusting a transmission of connectivity signals to a server by transmitting the connectivity signals to the server in response to an event trigger when in the going-out-of-range reachability state. As an example, as described herein, adjusting component 119 of the UE (e.g., UE 110, FIG. 1) may adjust a transmission of connectivity signals 140 to a server (e.g., server 120 and/or 130, FIG. 1) by way of a network entity (e.g., network entity 121 and/or 131, FIG. 1). Further to the example, the adjusting of the transmission of connectivity signals 140 may comprise transmitting the connectivity signals 140 by transmission component 112 to server 120 and/or 130 when change in reachability state 117 indicates that the current reachability state 123 has changed to a going-out-of-range reachability state and in response to an event trigger. In this respect, the server may receive an indication of the change in reachability state from a respective application or UE operating system (e.g., change in reachability state indications 150 received by receiving component 210) and may adjust its operations accordingly (e.g., adjusting expected transmission of connectivity signals 140 at adjusting component 220).

Figure 5:
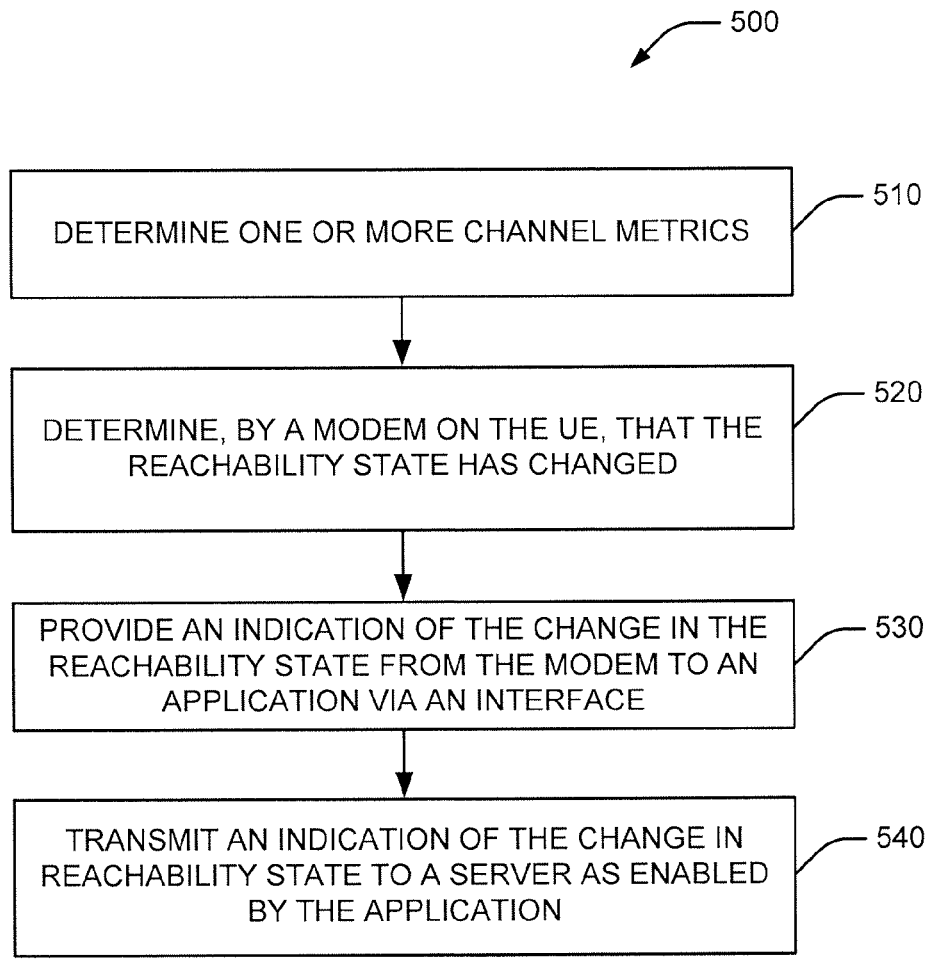
FIG. 5 is a flowchart illustrating an aspect of the application signaling adjustment features of a modem and application of the UE.

Referring to FIG. 5, in operation, a UE such as UE 110 (FIG. 1) may include modem component 116, which may be executed to perform various aspects of method 500 to enhance signaling from applications.

As an example, at block 510 of method 500, modem component 116 of UE 110 may determine one or more channel metrics. Further to the example, at block 520 of method 500, modem component 116 may be executed to determine that the reachability state of UE 110 has changed. In an aspect at block 530, modem component 116 may be enabled to communicate with one or more applications 114 of UE 110 by way of interface module 113. The modem 116 may also be enabled to communicate with the operating system module 115 of UE 110 by way of interface module 113. Further in the aspect at block 530, modem component 116 may provide an indication of the change in reachability state 117 to one or more applications 114 via interface module 113. In block 540, one or more applications 114 may enable transmission component 112 to transmit a change in reachability state indicator 150 to a server such as server 120 and/or 130 (FIG. 1) by way of a network entity such as network entity 121 and/or 131 (FIG. 1).

Figure 6:
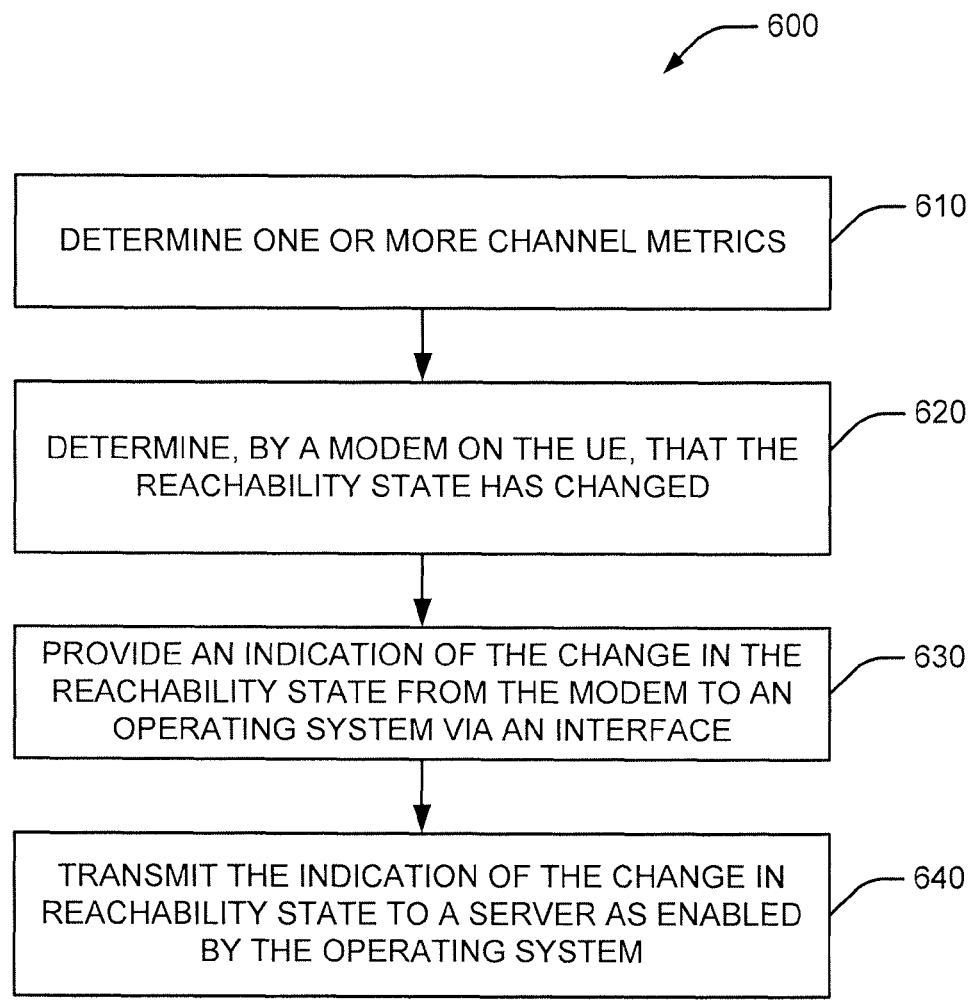
FIG. 6 is a flowchart illustrating an aspect of the application signaling adjustment features of a modem and operating system of the UE.

Referring to FIG. 6, in another aspect, UE 110 may enable modem component 116 to provide an indication of the change in reachability state to an operating system module of UE 110 in method 600.

As an example, at block 610 of method 600, modem component 116 of UE 110 may determine one or more channel metrics. Further to the example, at block 620 of method 600, modem component 116 may be executed to determine that the reachability state of UE 110 has changed. In an aspect at block 630, modem component 116 may be enabled to communicate with one or more applications 114 of UE 110 by way of interface module 113. The modem 116 may also be enabled to communicate with the operating system module 115 of UE 110 by way of interface module 113. Further in the aspect at block 630, modem component 116 may provide an indication of the change in reachability state 117 to operating system module 115 via interface module 113. In block 640, operating system module 115 may enable transmission component 112 to transmit a change in reachability state indicator 150 to a server such as server 120 and/or 130 (FIG. 1) by way of a network entity such as network entity 121 and/or 131 (FIG. 1).

Figure 7:
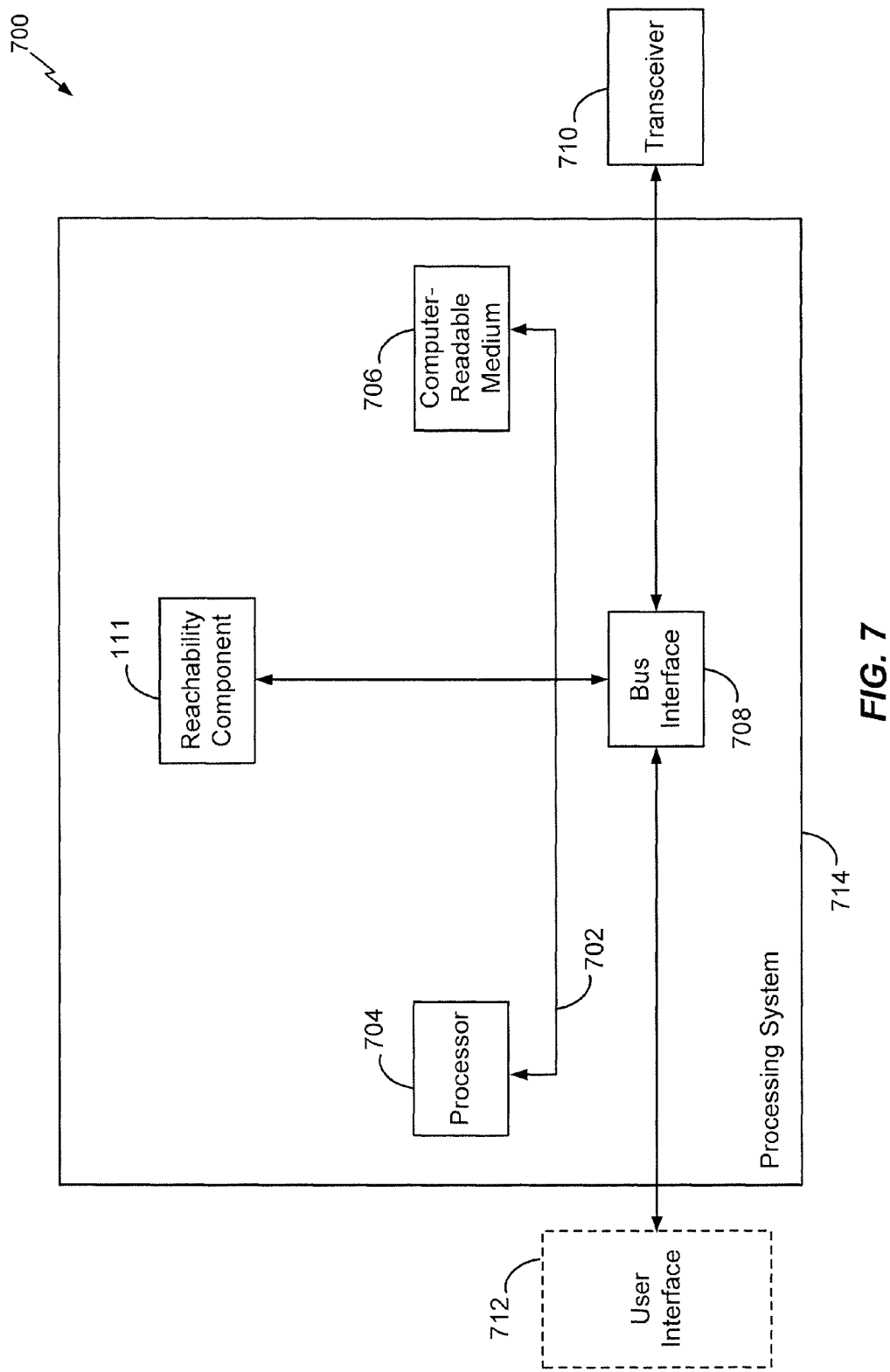
FIG. 7 is a diagram illustrating an example of a hardware implementation for an apparatus employing a processing system.

FIG. 7 is a block diagram illustrating an example of a hardware implementation for an apparatus 700 employing a processing system 714. In this example, the processing system 714 may be implemented with a bus architecture, represented generally by the bus 702. The bus 702 may include any number of interconnecting buses and bridges depending on the specific application of the processing system 714 and the overall design constraints. The bus 702 links together various circuits including one or more processors (represented generally by the processor 704), computer-readable media (represented generally by the computer-readable medium 106), and one or more reachability components (represented generally by reachability component 111). The functions and features of reachability component 111 are not limited to being implemented in reachability component 111 and may be implemented in processor 704, computer-readable medium 706, or both.

The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium, and may include modem component 116. Depending upon the nature of the apparatus, a user interface 712 (e.g., keypad, display, speaker, microphone, joystick) may also be provided.

The processor 704 is responsible for managing the bus 702 and general processing, including the execution of software stored on the computer-readable medium 706. The software, when executed by the processor 704, causes the processing system 714 to perform the various functions described herein for any particular apparatus. For example, the processing system 714 may perform various functions associated with determining one or more channel metrics, identifying a change in a reachability state based at least in part on one or more channel metrics, and adjusting a transmission of connectivity signals to a server from an application running or executing on the processing system 714, where the adjusting may be based at least in part on an indication of the change in the reachability state provided to the application via an interface in communication with a modem. Although a modem is not shown, a modem may be in communication with the processing system 714. Moreover, a modem may be implemented as part of the transceiver 710 of FIG. 7. The computer-readable medium 706 may also be used for storing data that is manipulated by the processor 704 when executing software.

Figure 8:
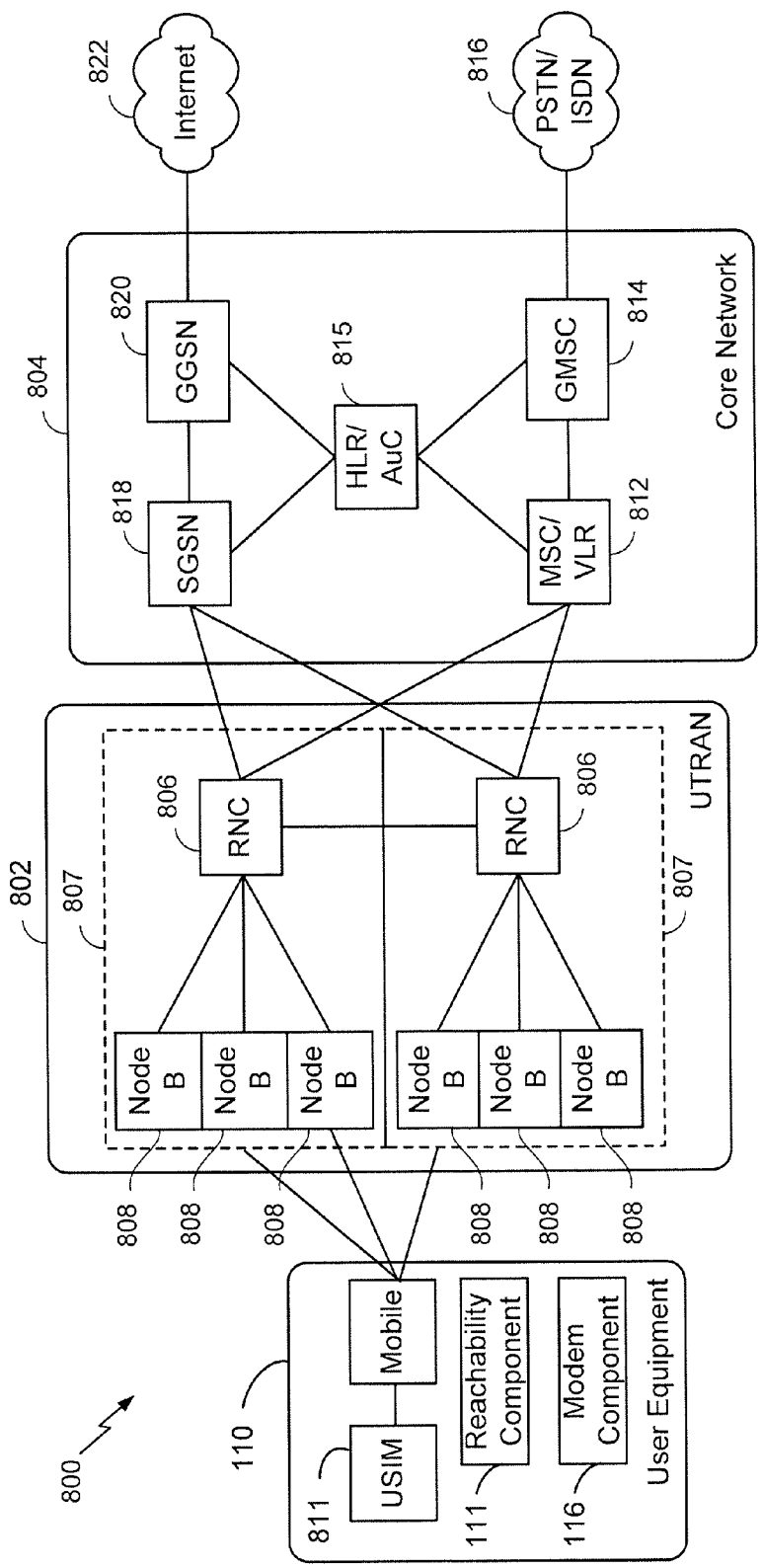
FIG. 8 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 8 are presented with reference to a UMTS system 800 employing a W-CDMA air interface. A UMTS network includes three interacting domains: a Core Network (CN) 804, a UMTS Terrestrial Radio Access Network (UTRAN) 702, and UE 110. In this example, the UE 110 may include the reachability component 111 and the modem component 116 of FIG. 1. Although not shown, the UE 110 may also include the transmission component 112, the interface module 113, the one or more applications 114, and the operating system module 115 described above. In this example, the UTRAN 802 provides various wireless services including telephony, video, data, messaging, broadcasts, and/or other services. The UTRAN 802 may include a plurality of Radio Network Subsystems (RNSs) such as an RNS 807, each controlled by a respective Radio Network Controller (RNC) such as an RNC 806. Here, the UTRAN 802 may include any number of RNCs 806 and RNSs 807 in addition to the RNCs 806 and RNSs 807 illustrated herein. The RNC 806 is an apparatus responsible for, among other things, assigning, reconfiguring and releasing radio resources within the RNS 807. The RNC 806 may be interconnected to other RNCs (not shown) in the UTRAN 802 through various types of interfaces such as a direct physical connection, a virtual network, or the like, using any suitable transport network.

Communication between a UE 110 and a Node B 808 may be considered as including a physical (PHY) layer and a medium access control (MAC) layer. Further, communication between a UE 110 and an RNC 806 by way of a respective Node B 808 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 807 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 808 are shown in each RNS 807; however, the RNSs 807 may include any number of wireless Node Bs. The Node Bs 808 provide wireless access points to a CN 804 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 110 may further include a universal subscriber identity module (USIM) 811, which contains a user's subscription information to a network. For illustrative purposes, one UE 110 is shown in communication with a number of the Node Bs 808. The DL, also called the forward link, refers to the communication link from a Node B 808 to a UE 110, and the UL, also called the reverse link, refers to the communication link from a UE 110 to a Node B 808. UE 110 may also include reachability component 111 and modem component 116.

The CN 804 interfaces with one or more access networks, such as the UTRAN 802. As shown, the CN 804 is a GSM core network. However, as those skilled in the art will recognize, the various concepts presented throughout this disclosure may be implemented in a RAN, or other suitable access network, to provide UEs with access to types of CNs other than GSM networks.

The CN 804 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 804 supports circuit-switched services with a MSC 812 and a GMSC 814. In some applications, the GMSC 814 may be referred to as a media gateway (MGW). One or more RNCs, such as the RNC 806, may be connected to the MSC 812. The MSC 812 is an apparatus that controls call setup, call routing, and UE mobility functions. The MSC 812 also includes a VLR that contains subscriber-related information for the duration that a UE is in the coverage area of the MSC 812. The GMSC 814 provides a gateway through the MSC 812 for the UE to access a circuit-switched network 216. The GMSC 814 includes a home location register (HLR) 815 containing subscriber data, such as the data reflecting the details of the services to which a particular user has subscribed. The HLR is also associated with an authentication center (AuC) that contains subscriber-specific authentication data. When a call is received for a particular UE, the GMSC 814 queries the HLR 815 to determine the UE's location and forwards the call to the particular MSC serving that location.

The CN 804 also supports packet-data services with a serving GPRS support node (SGSN) 818 and a gateway GPRS support node (GGSN) 820. GPRS, which stands for General Packet Radio Service, is designed to provide packet-data services at speeds higher than those available with standard circuit-switched data services. The GGSN 820 provides a connection for the UTRAN 802 to a packet-based network 822. The packet-based network 822 may be the Internet, a private data network, or some other suitable packet-based network. The primary function of the GGSN 820 is to provide the UEs 110 with packet-based network connectivity. Data packets may be transferred between the GGSN 820 and the UEs 110 through the SGSN 818, which performs primarily the same functions in the packet-based domain as the MSC 812 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 808 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL). HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 110 provides feedback to the node B 808 over the HS-DPCCH to indicate whether it correctly decoded a packet on the downlink.

HS-DPCCH further includes feedback signaling from the UE 110 to assist the node B 808 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 808 and/or the UE 110 may have multiple antennas supporting MIMO technology. The use of MIMO technology enables the node B 808 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 110 to increase the data rate or to multiple UEs 110 to increase the overall system capacity. This is achieved by spatially precoding each data stream and then transmitting each spatially precoded stream through a different transmit antenna on the downlink. The spatially precoded data streams arrive at the UE(s) 110 with different spatial signatures, which enables each of the UE(s) 110 to recover the one or more the data streams destined for that UE 110. On the uplink, each UE 110 may transmit one or more spatially precoded data streams, which enables the node B 808 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 9:
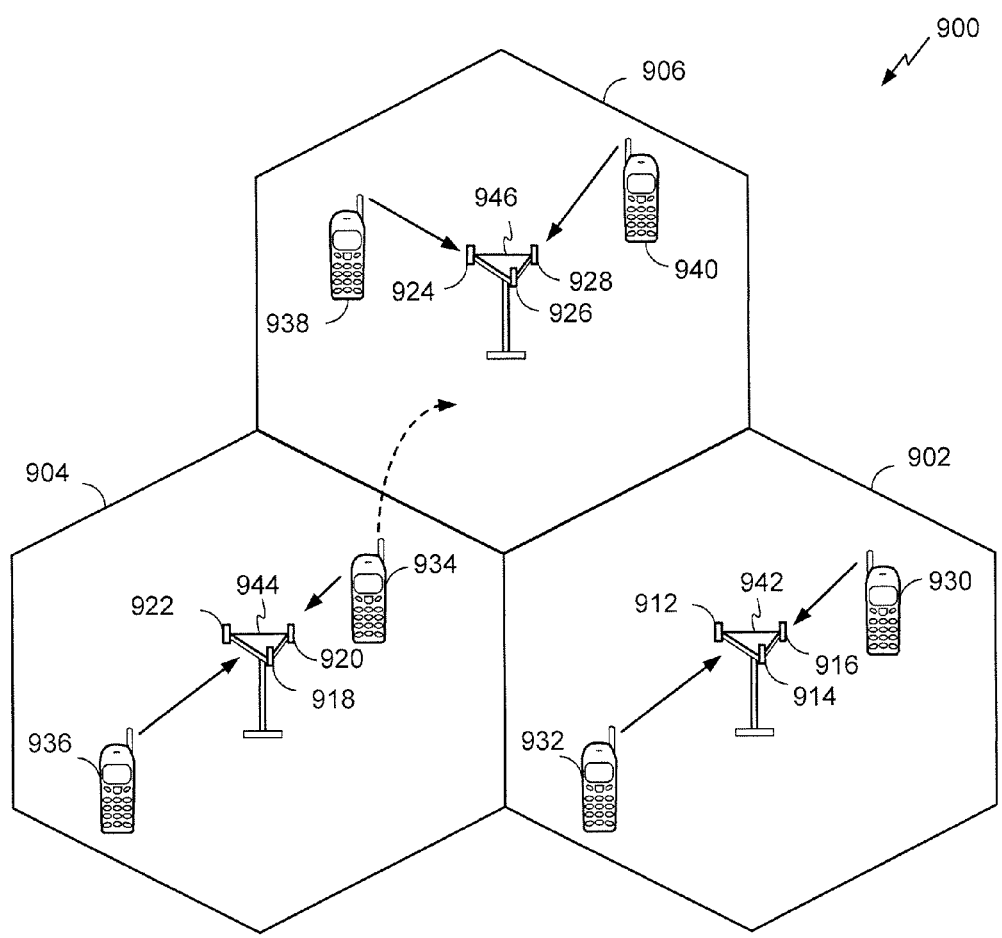
FIG. 9 is a conceptual diagram illustrating an example of an access network.

Referring to FIG. 9, an access network 900 in a UTRAN architecture is illustrated. The multiple access wireless communication system includes multiple cellular regions (cells), including cells 902, 904, and 906, each of which may include one or more sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 may include several wireless communication devices, e.g., UEs, which may be in communication with one or more sectors of each cell 902, 904 or 906. For example, UEs 930 and 932 may be in communication with Node B 942, UEs 934 and 936 may be in communication with Node B 944, and UEs 938 and 940 can be in communication with Node B 946. Here, each Node B 942, 944, 946 is configured to provide an access point to a CN 804 (see FIG. 8) for all the UEs 930, 932, 934, 936, 938, 940 in the respective cells 902, 904, and 906. The UEs of FIG. 9 may be examples of the UE 110 of FIG. 1. In this respect, the UEs of FIG. 9 may include the reachability component 111, the modem component 116, the transmission component 112, the interface module 113, the one or more applications 114, and the operating system module 115 described above.

As the UE 934 moves from the illustrated location in cell 904 into cell 906, a serving cell change (SCC) or handover may occur in which communication with the UE 934 transitions from the cell 904, which may be referred to as the source cell, to cell 906, which may be referred to as the target cell. Management of the handover procedure may take place at the UE 934, at the Node Bs corresponding to the respective cells, at a radio network controller 906 (see FIG. 2), or at another suitable node in the wireless network. For example, during a call with the source cell 904, or at any other time, the UE 934 may monitor various parameters of the source cell 904 as well as various parameters of neighboring cells such as cells 906 and 902. Further, depending on the quality of these parameters, the UE 934 may maintain communication with one or more of the neighboring cells. During this time, the UE 934 may maintain an Active Set, that is, a list of cells that the UE 934 is simultaneously connected to (i.e., the UTRA cells that are currently assigning a downlink dedicated physical channel DPCH or fractional downlink dedicated physical channel F-DPCH to the UE 934 may constitute the Active Set).

The modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 10.

Figure 10:
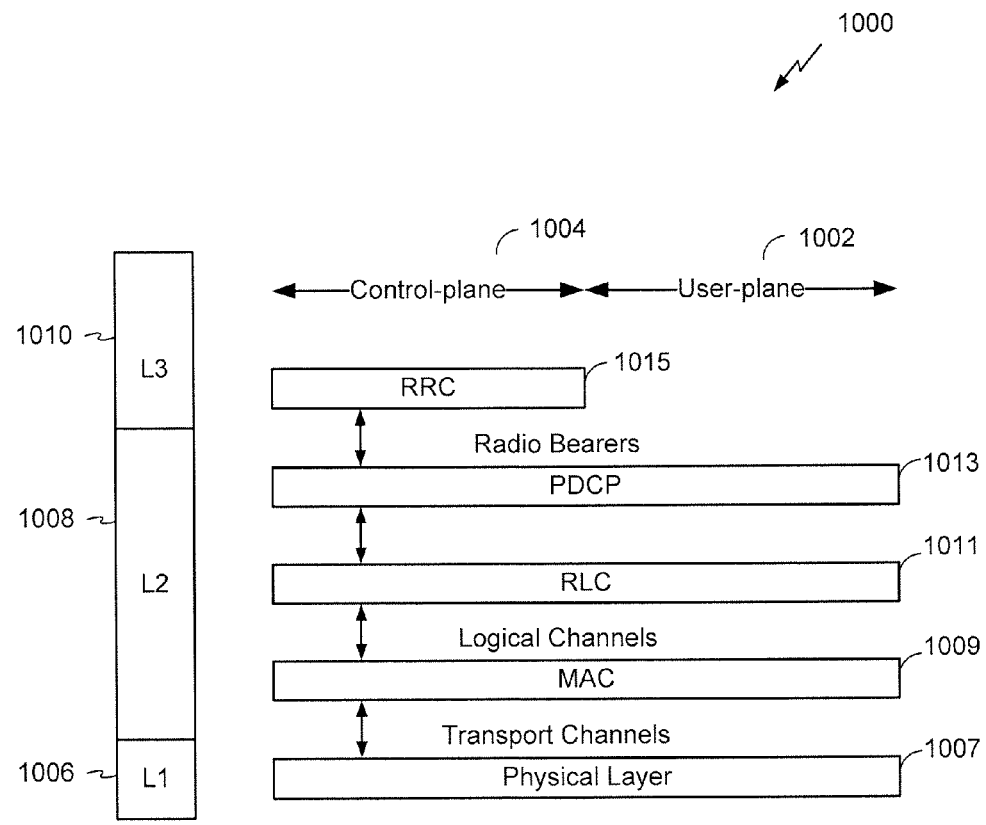
FIG. 10 is a conceptual diagram illustrating an example of a radio protocol architecture for the user and control plane.

Referring to FIG. 10, example radio protocol architecture 1000 relates to the user plane 1002 and the control plane 1004 of a UE or node B/base station. For example, architecture 1000 may be included in a UE such as the UE 110 (FIG. 1). In this respect, the architecture 1000 may be used in a UE that supports determining one or more channel metrics, identifying a change in a reachability state based at least in part on one or more channel metrics, and adjusting a transmission of connectivity signals to a server from an application, where the adjusting may be based at least in part on an indication of the change in the reachability state provided to the application via an interface in communication with a modem in the UE. The radio protocol architecture 1000 for the UE and node B is shown with three layers: Layer 1 1006, Layer 2 1008, and Layer 3 1010. Layer 1 1006 is the lowest layer and implements various physical layer signal processing functions. As such, Layer 1 1006 includes the physical layer 1007. Layer 2 (L2 layer) 1008 is above the physical layer 1007 and is responsible for the link between the UE and node B over the physical layer 1007. Layer 3 (L3 layer) 1010 includes a radio resource control (RRC) sublayer 1015. The RRC sublayer 1015 handles the control plane signaling of Layer 3 between the UE and the UTRAN.

In the user plane, the L2 layer 1008 includes a media access control (MAC) sublayer 1009, a radio link control (RLC) sublayer 1011, and a packet data convergence protocol (PDCP) 1013 sublayer, which are terminated at the node B on the network side. Although not shown, the UE may have several upper layers above the L2 layer 108 including a network layer (e.g., IP layer) that is terminated at a PDN gateway on the network side, and an application layer that is terminated at the other end of the connection (e.g., far end UE, server, etc.).

The PDCP sublayer 1013 provides multiplexing between different radio bearers and logical channels. The PDCP sublayer 1013 also provides header compression for upper layer data packets to reduce radio transmission overhead, security by ciphering the data packets, and handover support for UEs between node Bs. The RLC sublayer 1011 provides segmentation and reassembly of upper layer data packets, retransmission of lost data packets, and reordering of data packets to compensate for out-of-order reception due to hybrid automatic repeat request (HARQ). The MAC sublayer 1009 provides multiplexing between logical and transport channels. The MAC sublayer 1009 is also responsible for allocating the various radio resources (e.g., resource blocks) in one cell among the UEs. The MAC sublayer 1009 is also responsible for HARQ operations.

Figure 11:
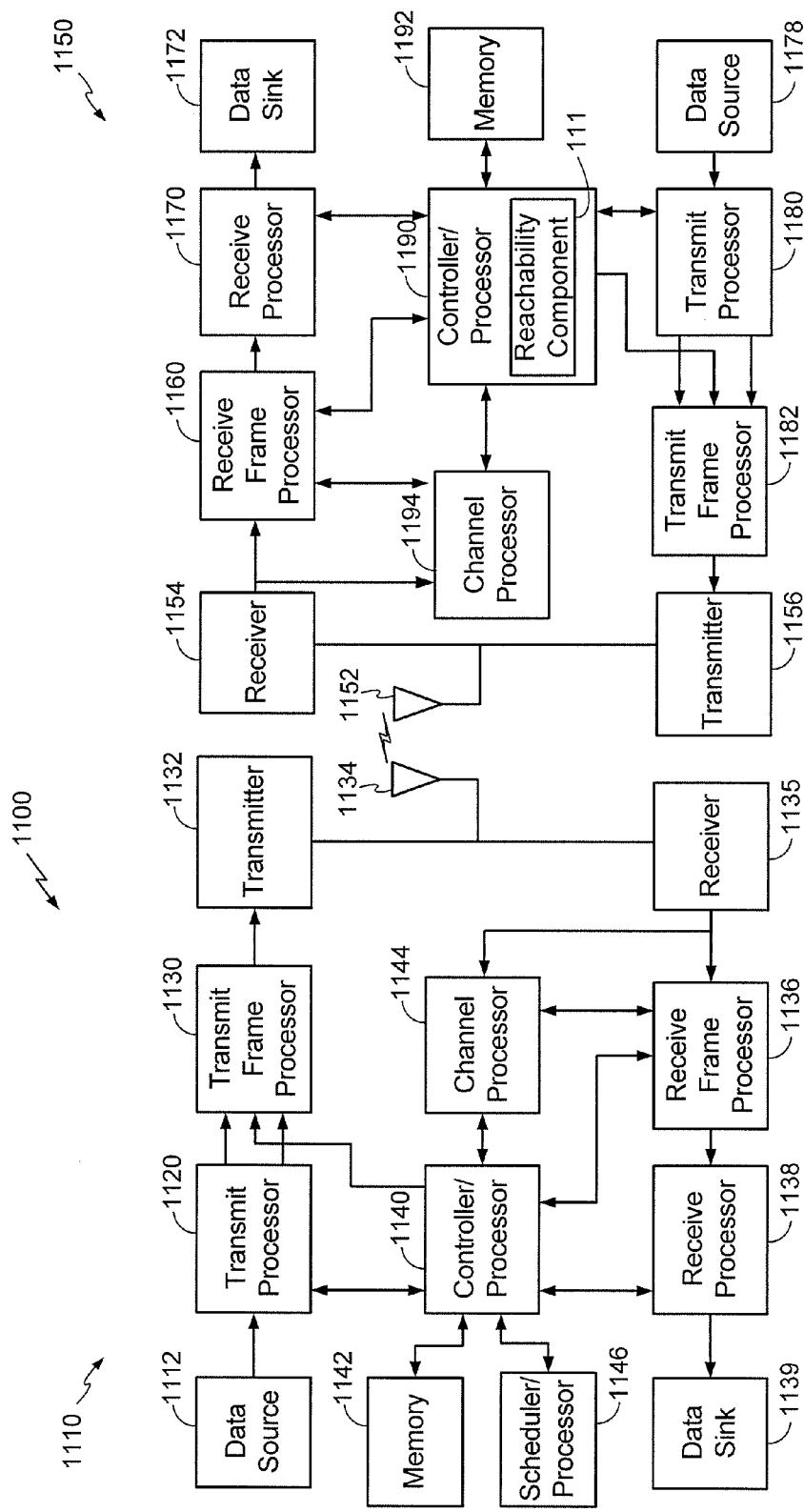
FIG. 11 is a block diagram conceptually illustrating an example of a Node B in communication with a UE in a telecommunications system.

FIG. 11 is a block diagram of a Node B 1110 in communication with a UE 1150, where the Node B 1110 may be an example of the Node B 808 in FIG. 8, and the UE 1150 may be an example of the UE 110 in FIG. 1. In the downlink communication, a transmit processor 1120 may receive data from a data source 112 and control signals from a controller/processor 1140. The transmit processor 1120 provides various signal processing functions for the data and control signals, as well as reference signals (e.g., pilot signals). For example, the transmit processor 1120 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1144 may be used by a controller/processor 1140 to determine the coding, modulation, spreading, and/or scrambling schemes for the transmit processor 1120. These channel estimates may be derived from a reference signal transmitted by the UE 1150 or from feedback from the UE 1150. The symbols generated by the transmit processor 1120 are provided to a transmit frame processor 1130 to create a frame structure. The transmit frame processor 1130 creates this frame structure by multiplexing the symbols with information from the controller/processor 1140, resulting in a series of frames. The frames are then provided to a transmitter 1132, which provides various signal conditioning functions including amplifying, filtering, and modulating the frames onto a carrier for downlink transmission over the wireless medium through antenna 1134. The antenna 1134 may include one or more antennas, for example, including beam steering bidirectional adaptive antenna arrays or other similar beam technologies.

At the UE 1150, a receiver 1154 receives the downlink transmission through an antenna 1152 and processes the transmission to recover the information modulated onto the carrier. The infatuation recovered by the receiver 1154 is provided to a receive frame processor 1160, which parses each frame, and provides information from the frames to a channel processor 1194 and the data, control, and reference signals to a receive processor 1170. The receive processor 1170 then performs the inverse of the processing performed by the transmit processor 1120 in the Node B 1110. More specifically, the receive processor 1170 descrambles and despreads the symbols, and then determines the most likely signal constellation points transmitted by the Node B 1110 based on the modulation scheme. These soft decisions may be based on channel estimates computed by the channel processor 1194. The soft decisions are then decoded and deinterleaved to recover the data, control, and reference signals. The CRC codes are then checked to determine whether the frames were successfully decoded. The data carried by the successfully decoded frames will then be provided to a data sink 1172, which represents applications running in the UE 1150 and/or various user interfaces (e.g., display). Control signals carried by successfully decoded frames will be provided to a controller/processor 1190. When frames are unsuccessfully decoded by the receiver processor 1170, the controller/processor 1190 may also use an acknowledgement (ACK) and/or negative acknowledgement (NACK) protocol to support retransmission requests for those frames. In one aspect, controller/processor 1190 may also include reachability component 111. In other aspects, at least a portion of the functions or features described above with respect to the reachability component 111 may be implemented in other modules, processors, and/or components of the UE 1150. Moreover, although not shown, the UE 1150 may include a modem such as the modem component 116. In one example, a modem may be implemented in the UE 1150 as part of the receiver 1154 and/or the transmitter 1156.

In the uplink, data from a data source 1178 and control signals from the controller/processor 1190 are provided to a transmit processor 1180. The data source 1178 may represent applications running in the UE 1150 and various user interfaces (e.g., keyboard). Similar to the functionality described in connection with the downlink transmission by the Node B 1110, the transmit processor 1180 provides various signal processing functions including CRC codes, coding and interleaving to facilitate FEC, mapping to signal constellations, spreading with OVSFs, and scrambling to produce a series of symbols. Channel estimates, derived by the channel processor 1194 from a reference signal transmitted by the Node B 1110 or from feedback contained in the midamble transmitted by the Node B 1110, may be used to select the appropriate coding, modulation, spreading, and/or scrambling schemes. The symbols produced by the transmit processor 1180 will be provided to a transmit frame processor 1182 to create a frame structure. The transmit frame processor 1182 creates this frame structure by multiplexing the symbols with information from the controller/processor 1190, resulting in a series of frames. The frames are then provided to a transmitter 1156, which provides various signal conditioning functions including amplification, filtering, and modulating the frames onto a carrier for uplink transmission over the wireless medium through the antenna 1152.

The uplink transmission is processed at the Node B 1110 in a manner similar to that described in connection with the receiver function at the UE 1150. A receiver 1135 receives the uplink transmission through the antenna 1134 and processes the transmission to recover the information modulated onto the carrier. The information recovered by the receiver 1135 is provided to a receive frame processor 1136, which parses each frame, and provides information from the frames to the channel processor 1144 and the data, control, and reference signals to a receive processor 1138. The receive processor 1138 performs the inverse of the processing performed by the transmit processor 1180 in the UE 1150. The data and control signals carried by the successfully decoded frames may then be provided to a data sink 1139 and the controller/processor, respectively. If some of the frames were unsuccessfully decoded by the receive processor, the controller/processor 1140 may also use an acknowledgement (ACK) and/or negative acknowledgement (NACK) protocol to support retransmission requests for those frames.

The controller/processors 1140 and 1190 may be used to direct the operation at the Node B 1110 and the UE 1150, respectively. For example, the controller/processors 1140 and 1190 may provide various functions including timing, peripheral interfaces, voltage regulation, power management, and other control functions. The computer readable media of memories 1142 and 1192 may store data and software for the Node B 1110 and the UE 1150, respectively. A scheduler/processor 1146 at the Node B 1110 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for signaling adjustments, comprising:
transmitting, periodically, connectivity signals generated by an application on a user equipment (UE) to an application server, the connectivity signals indicating that the application is reachable;
identifying, by a modem of the (UE), a change in a reachability state of the UE based at least in part on one or more channel metrics determined by the modem of the UE and a comparison of a previous reachability state with a current reachability state;
providing an indication of the change in the reachability state from the modem to the application on the UE via an application programming interface, the application being independent of the modem;
adjusting, by the UE, the transmission of the connectivity signals to the application server from the application on the UE, the adjusting being carried out by the UE directly in response to the identified change in the reachability state provided to the application via the interface in communication with the modem; and
transmitting the connectivity signals according to the adjusted transmission and transmitting an indication of the change in the reachability state to the application server by way of a network entity, wherein the indication of the change in the reachability state indicates a need for the application server to adjust an expectation of transmission of connectivity signals from the UE.

2. The method of claim 1, further comprising providing the indication of the change in the reachability state from the modem to an operating system of the UE via the interface.

3. The method of claim 1, wherein identifying the change in the reachability state comprises applying a hysteresis by adjusting a threshold value to determine the current state of the reachability state based at least in part on the previous state of the reachability state.

4. The method of claim 1, wherein the one or more channel metrics comprise a signal quality metric.

5. The method of claim 1, wherein the one or more channel metrics comprise a signal strength metric.

6. The method of claim 1, wherein:
identifying the change in the reachability state comprises determining that the reachability state has changed to a strong state, and
adjusting the transmission of connectivity signals to an application server comprises reducing a number of the connectivity signals transmitted to the application server when in the strong state.

7. The method of claim 1, wherein:
identifying the change in the reachability state comprises determining that the reachability state has changed to a weak state, and
adjusting the transmission of connectivity signals to the application server comprises periodically transmitting the connectivity signals to the application server when in the weak state.

8. The method of claim 1, wherein:
identifying the change in the reachability state comprises determining that the reachability state has changed to a going-out-of-range state, and
adjusting the transmission of connectivity signals to the application server comprises transmitting the connectivity signals to the application server in response to an event trigger when in the going-out-of-range state.

9. The method of claim 1, wherein the application is a first application, the method further comprising adjusting, based at least in part on the change in the reachability state, a transmission of connectivity signals to a different application server from a second application on the UE.

10. The method of claim 1, wherein adjusting the transmission of connectivity signals to the application server comprises adjusting the transmission from a periodic transmission of connectivity signals to a non-periodic transmission of connectivity signals.

11. The method of claim 1, wherein:
identifying the change in the reachability state comprises determining that the reachability state has changed to a strong state, and
adjusting a transmission of connectivity signals to an application server comprises transmitting non-periodic transmissions of connectivity signals to the server when in the strong state.

12. A non-transitory computer-readable medium comprising code that, when executed by a processor or processing system included within a user equipment (UE), causes the UE to:
transmit, periodically, connectivity signals generated by an application on the UE to an application server, the connectivity signals indicating that the application is reachable;
identify, by a modem of the UE, a change in a reachability state of the UE based at least in part on one or more channel metrics determined by the modem of the UE and a comparison of a previous reachability state with a current reachability state;
provide an indication of the change in the reachability state from the modem to the application on the UE via an application programming interface, the application being independent of the modem;
adjust the transmission of the connectivity signals to the application server from the application on the UE, the adjusting being carried out by the UE directly in response to the identified change in the reachability state provided to the application via the interface in communication with the modem; and
transmit the connectivity signals according to the adjusted transmission and transmit an indication of the change in the reachability state to the application server by way of a network entity, wherein the indication of the change in the reachability state indicates a need for the application server to adjust an expectation of transmission of connectivity signals from the UE.

13. An apparatus for signaling adjustments, comprising:
a transmitter configured to transmit, periodically, connectivity signals generated by an application on a user equipment (UE) to an application server, the connectivity signals indicating that the application is reachable;
a modem component configured to determine one or more channel metrics and identify a change in a reachability state of the UE based at least in part on the one or more channel metrics and a comparison of a previous reachability state with a current reachability state; and
a processor communicatively coupled to the transmitter and the modem component via an application programming interface that provides an indication of a change in the reachability state of the UE from the modem component to an application executed by the processor, the application being independent of the modem component, the processor configured to:
adjust the transmission of connectivity signals to the application server from the application on the UE, the adjusting being carried out by the UE directly in response to the identified change in the reachability state provided to the application,
wherein the transmitter is configured to transmit the connectivity signals according to the adjusted transmission and transmit a change in reachability state indicator to the application server by way of a network entity, wherein the change in reachability state indicator indicates a need for the application server to adjust an expectation of transmission of connectivity signals from the UE.

14. The apparatus of claim 13, wherein the modem component is configured to apply a hysteresis by adjusting a threshold value to determine a current state of the reachability state based at least in part on a previous state of the reachability state.

15. The apparatus of claim 13, wherein the one or more channel metrics comprise a signal quality metric.

16. The apparatus of claim 13, wherein the one or more channel metrics comprise a signal strength metric.

17. The apparatus of claim 13, wherein the modem component is configured to determine that the reachability state has changed.

18. The apparatus of claim 13, wherein the application is a first application, the application programming interface is further configured to provide the indication of the change in the reachability state from the modem component to a second application on the UE, and the processor is further configured to adjust, based at least in part on the change in the reachability state, a transmission of connectivity signals to a different application server from the second application on the UE.

* * * * *